United States Patent [19]
Lee et al.

[11] Patent Number: 5,903,279
[45] Date of Patent: May 11, 1999

[54] METHOD FOR ANTIALIASING

[75] Inventors: Chi-Chih Lee, Taipei; Wen-Zen Shen, Hsinchu; Yea-Yun Yang, Miauli; Chong-Ching Chen; Won-Yih Lin, both of Taichung, all of Taiwan

[73] Assignee: Industrial Technology Research Institute, Taiwan

[21] Appl. No.: 08/992,006

[22] Filed: Dec. 17, 1997

[51] Int. Cl.$^6$ .................................................. G06F 15/00
[52] U.S. Cl. ............................................................ 345/443
[58] Field of Search ........................... 345/432, 441, 345/443, 429, 431, 147, 148, 149, 136

[56]        References Cited
         U.S. PATENT DOCUMENTS

| | | | |
|---|---|---|---|
| 4,905,166 | 2/1990 | Schuerman | 364/518 |
| 5,059,520 | 10/1991 | Kim | 395/101 |
| 5,579,450 | 11/1996 | Hanyu et al. | 395/115 |

*Primary Examiner*—Phu K. Nguyen
*Attorney, Agent, or Firm*—Finnegan, Henderson, Farabow, Garrett & Dunner, L.L.P.

[57]              ABSTRACT

A modified three-pixel antialiasing method wherein the closest pixel from a displayed line has a constant display intensity includes the steps of locating a first pixel having a shortest distance along an axis of the pixel matrix array from the line, determining the shortest distance, calculating pixel intensity for the first pixel by multiplying a maximum intensity of the first pixel with a constant value, locating a second pixel having a second shortest distance along the axis from the line, locating a third pixel having a third shortest distance along the axis from the line, calculating pixel intensity for the second pixel, and calculating pixel intensity for the third pixel.

16 Claims, 6 Drawing Sheets

METHOD FOR ANTIALIASING

BACKGROUND OF THE INVENTION

1. Field of the Invention

This invention pertains in general to a method for displaying or providing an antialiased image and, more particularly, to a pre-filtering method for generating an antialiased image in a device having a matrix array of pixels.

2. Description of the Related Art

In applications that provide a display or output as a plurality of pixels arranged in a predetermined pattern, such as in computer graphics, copiers and printers, the displayed image often appears "jagged" or stepped" around the contour or boundary lines. This is known as aliasing. Since the pixels in these applications are arranged in a matrix, when an output, for example, a line, is horizontal or vertical, the line is displayed by a row or column of pixels, respectively, that the line coincides with. The displayed line appears as a smooth straight line. However, when the output line is near, but not coincident with, the horizontal or vertical direction, the pixel-displayed line is approximated by a series of pixels because many parts of the line do not overlie any pixel. As a result, the displayed line exhibits "jaggies" or a stair step appearance. Conventionally, several antialiasing techniques are employed to remove the "jaggies" and reduce the effect of aliasing. The techniques may be divided into pre-filtering and post-filtering techniques.

Pre-filtering techniques are those implemented before pixel sampling. Each pixel is treated as an area, and pixel intensity is computed based on the overlap of an object to be displayed with a pixel's area. Pre-filering techniques may be further divided into unweighted area sampling and weighted area sampling. Unweighted area sampling, effected by means such as a box filter, sets pixel intensity in proportion to the amount of pixel area covered. Weighted area sampling determines pixel intensity based on the distance between the displayed object to the center of the pixel with reference to a weighted function. One filter that uses such a weighting function is a cone filter. Post-filtering, meanwhile, also known as supersampling, takes several samples and computes an average of the samples to determine each pixel's intensity.

Filters that are used to either provide pre-filtering or post-filtering are controlled by filter functions which represent distribution of light emitting areas for each pixel. Filter function, therefore, may provide an effective quantized formula to calculate the "image point," and is obtained through mathematical implementations and revisions until an acceptable image point is found. In an unweighted filter, each data or image sample has equal influence in determining the pixel's intensity. In other words, an unweighted filter computes an unweighted average. In contrast, a weighted filter provides the weights used to compute the average wherein each data sample is multiplied by its corresponding "weight" and the products are summed to produce a weighted average. This weighted average is used as the pixel intensity.

Figure 1:
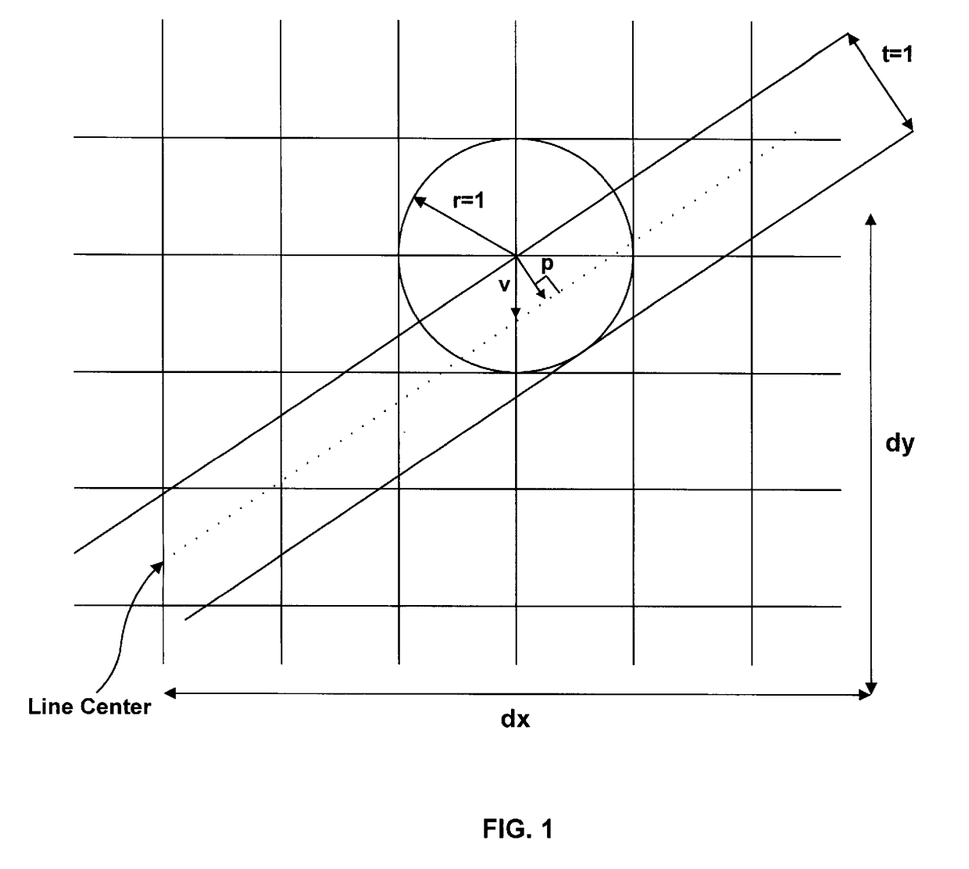
FIG. 1 shows a conventional conical filter having a radius equal to one unit.

As described above, weighted pre-filtering determines pixel intensity proportional to distance, and the relationship may be expressed as follows:

$$P_I = F_r(p, t) * I_{max}$$

where $P_I$ is the display intensity of the pixel, and $I_{max}$ is the maximum pixel intensity. $F_r$ represents a variable filter function according to the filter radius, r, and p is the normal distance from the pixel center to the center of the displayed line. Additionally, t represents the width of the displayed line. Conventionally, the center-to-center distance between two neighboring pixels is considered a unit distance. FIG. 1 shows a conical filter function having a radius equal to one. A conical function has a maximum value at the center, and the value decreases linearly away from the center. Referring to FIG. 1, when a straight line passes through the pixel, its intensity is proportional to the volume of the cone intersecting the line.

Even though the conical filter as shown in FIG. 1 generally provides acceptable displays, there are a number of calculations required to obtain display pixel intensity and generally a look-up table stored in a read-only-memory ("ROM") is also required to implement the conical filter. These factors, in turn, decrease the speed with which an image can be generated for display.

SUMMARY OF THE INVENTION

Additional features and advantages of the invention will be set forth in the description which follows, and in part will be apparent from the description, or may be learned by practice of the invention. The objectives and other advantages of the invention will be realized and attained by the process particularly pointed out in the written description and claims hereof, as well as the appended drawings.

To achieve these and other advantages, and in accordance with the purpose of the invention as embodied and broadly described, the invention related to an antialiasing method for displaying a line on a device including a matrix array of pixels. The method includes the steps of locating a first pixel having a shortest distance along an axis of the matrix array from the line, determining the shortest distance, calculating pixel intensity of the first pixel by multiplying a maximum intensity of the first pixel with a constant value, locating a second pixel having a second shortest distance along the axis from the line, locating a third pixel having a third shortest distance along the axis from the line, calculating pixel intensity for the second pixel, and calculating pixel intensity for the third pixel.

In another aspect of the invention, the constant value is 0.625.

Also in accordance with the present invention, there is provided an antialiasing method for displaying an image on a device including a matrix array of pixels. The method includes the steps identifying a point on the image to be displayed, locating a first pixel having a shortest distance along an axis of the matrix array from the point, determining the shortest distance, calculating pixel intensity for the first pixel by multiplying a maximum intensity of the first pixel with a constant value, calculating pixel intensity for a second pixel by multiplying a maximum pixel intensity with V' divided by two, wherein V' is a normalized distance between the first pixel and the line and is equal to the shortest distance plus 0.5, and calculating pixel intensity for a third pixel by multiplying a maximum pixel intensity with (1−V') divided by two.

Further in accordance with the present invention, there is provided a method for calculating intensities of selected pixels in a matrix of pixels for displaying a line. The method includes the steps of locating a first pixel having a shortest distance along an axis of the matrix array from the line, determining the shortest distance, calculating a first pixel intensity of the first pixel by multiplying a maximum intensity of the first pixel by a predetermined constant value, calculating a second pixel intensity for a second pixel above the first pixel, and calculating a third pixel intensity for a third pixel above the first pixel.

It is to be understood that both the foregoing general description and the following detailed description are exemplary and explanatory and are intended to provide further explanation of the invention as claimed.

The accompanying drawings are included to provide a further understanding of the invention and are incorporated in and constitute a part of this specification, illustrate one embodiment of the invention and, together with the description, serve to explain the principles of the invention.

BRIEF DESCRIPTION OF THE DRAWINGS

The accompanying drawings, which are incorporated in and constitute a part of this specification, illustrate embodiments of the invention and, together with the description, serve to explain the objects, advantages, and principles of the invention.

In the drawings.

DETAILED DESCRIPTION OF THE PREFERRED EMBODIMENTS

An antialiasing method in accordance with the present invention requires fewer calculations and therefore faster performance as compared to a conventional conical antialiasing method, while at the same time providing similarly acceptable displays. Such a method is a modified three-pixel antialiasing method wherein the pixel closest to a displayed line has a constant display intensity. Therefore, calculations of display intensity will only need to be made for the remaining two pixels. Furthermore, the total luminescence of the pixels varies according to the concentration of the intensity among the three pixels. If the total luminescence is distributed among the three pixels, the total luminescence increases. However, if the intensity is concentrated with one or two pixels, the total luminescence decreases. In contrast, the total pixel intensity of the conical method remains relatively unchanged.

Figure 2:
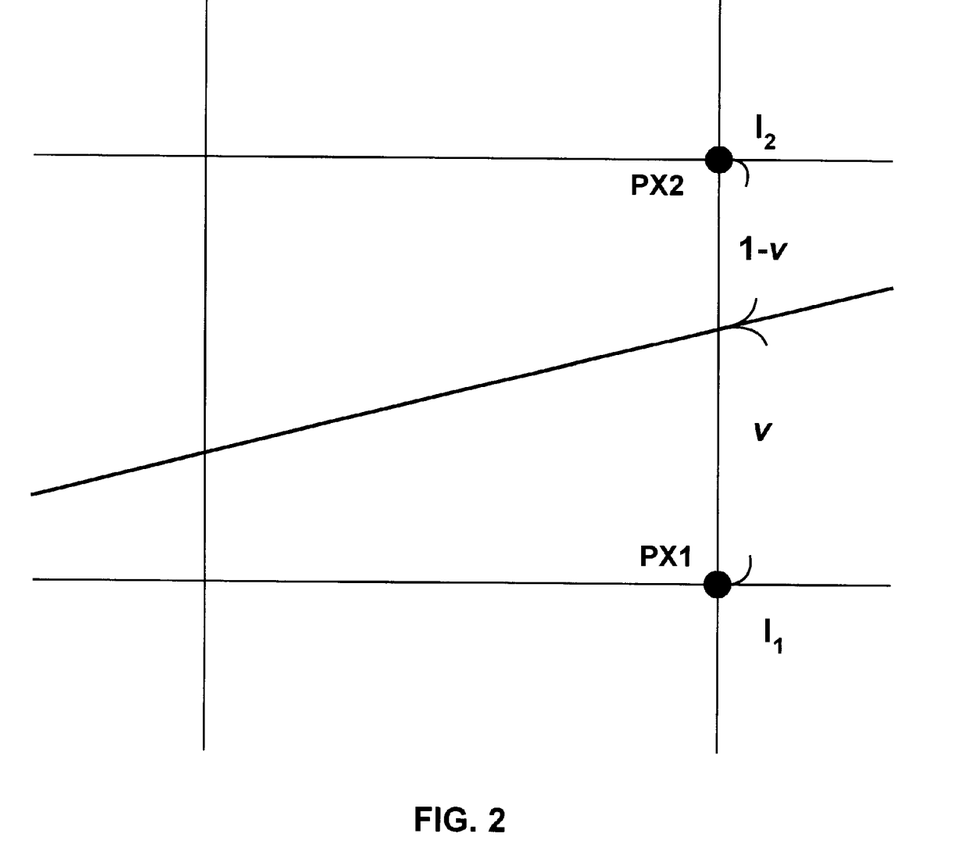
FIG. 2 shows pixels and a displayed line in a conventional two-point antialiasing method.

A conventional two-point antialiasing method is shown in FIG. 2. The two pixels, PX1 and PX2, display a line which passes between them. PX1 and PX2 are used to generate a portion of the line within the illuminable areas of the respective pixels. As already described, pixel intensity is determined by the following:

$$P_f = F_r(p, t) * I_{max}$$

where $F_r(p, t)$ is a linear filter function. Since p is the normal distance from the center of the pixel to the center of the displayed line, the distance V between the center of the pixel PX1 and the center of the line along an axis, such as the y-axis, of the matrix may be related to p as follows:

$$p = \frac{dx}{\sqrt{dx^2 - dy^2}} * V$$

As each antialiasing method employs a specific filter function, the transfer function for the conventional two-point antialiasing method, having the radius of the filter function normalized to one and a line width equal to one, is as follows:

$$F_1(d, 1) = \begin{cases} 1 - V & \text{for } PX1 \\ V & \text{for } PX2 \end{cases}$$

Therefore, the display intensity for each of the pixels is shown in the following Table 1:

TABLE 1

|  | Distance | Intensity |
| --- | --- | --- |
| PX2 | 1 − V | $V*|_{max}$ |
| PX1 | V | $(1 - V)*|_{max}$ |

Since the filter radius has been normalized to one, the distance between PX2 and the line is 1−V. It is clear from Table 1 that the pixel display intensity is inversely proportional to the distance between the pixel and the line. Even though a two-point antialiasing method requires fewer calculations and therefore provides relatively fast performance, the quality of the displayed image is inferior to that of the conical filter.

Figure 3:
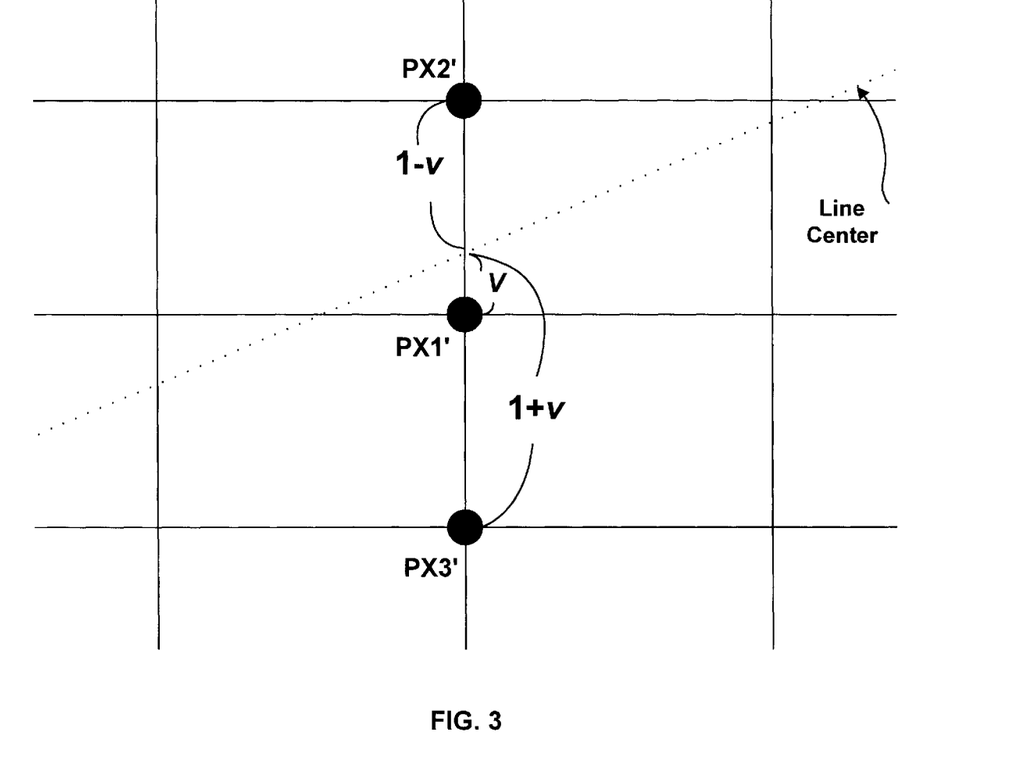
FIG. 3 shows pixels and a displayed line in a three-point antialiasing method.

An improvement over the two-point antialiasing method is a conventional three-point antialiasing method. FIG. 3 shows the pixels and a displayed line in a three-point antialiasing method. The line passes between two pixels, PX1' and PX2'. Along with a third pixel, PX3', the portion of the line within the illuminated areas covered by the three pixels is generated. The distance between the first pixel, PX1', and the line is V, where V is the distance along the y-axis between the line and the pixel closest thereto. In addition, the first pixel, PX1', is the closest pixel to the line. The distance between the second pixel, PX2', and the line is 1−V. The second pixel has the second closest distance from the line among the three pixels. The third pixel, PX3', is the third closest pixel to the line along the same axis as the first two pixels. The three pixels are chosen along an axis, usually the y-axis, to facilitate hardware implementation. In the event that the x-axis of the display matrix is longer than the y-axis, the matrix is rotated ninety degrees and the longer axis is deemed the y-axis. Therefore, PX2' is always above the middle-pixel PX1' and PX3' is always below PX1'.

Referring to FIG. 3, the third pixel is below PX1' and is at a distance 1+V from the line. Pixel intensity is determined by:

$$P_f = F_r(d, t) * I_{max}$$

The filter function for the conventional three-pixel antialiasing method, having radius of the filter function normalized to equal to one, is $F_1(d, 1) = 1.5 - d$, where d is the distance between the center of the pixel to the center of the displayed line. In addition, because the total pixel intensity for the conventional three-pixel antialiasing method is twice that of the original line, the pixel intensity for each of the three pixels is halved. The display intensity for each of the pixels is shown in the following Table 2:

TABLE 2

|  | Distance | $F_1(d, 1)$ | Intensity |
|---|---|---|---|
| PX2' | 1 − V | 1.5 − (1 − V) | $[(0.5 + V)/2]*|_{max}$ |
| PX1' | \|V\| | 1.5 − \|V\| | $[(1.5 − |V|/2]*|_{max}$ |
| PX3' | 1 + V | 1.5 − (1 + V) | $[(0.5 − V/2]*|_{max}$ |

Also, since V represents the distance between the displayed line and the closest pixel, the maximum value of distance |V| is 0.5. As discussed above, PX2' is taken as the pixel above PX1' and PX3' is below PX1' along the y-axis for purposes of facilitating hardware implementation. This is based on the assumption that the line to be displayed passes between pixels PX1' and PX2'. If, however, the line passes between pixels PX1' and PX3', the distance between the middle-pixel PX1' and the line is negative relative to the same distance when the line passes between PX2' and PX1'. Therefore, the absolute value is taken of the distance V in the calculation of pixel intensities. Furthermore, to normalize this distance V, the term V' is defined such that V'=V+0.5. Therefore, the values of V' vary between 0 and 1 and the above Table 2 may be simplified as shown in the following Table 3:

TABLE 3

|  | Distance | Intensity |
|---|---|---|
| PX2' | 1.5 − V' | $(V'/2)*|_{max}$ |
| PX1' | \|V' − 0.5\| | $[(1.5 − |V' − 0.5|)/2]*|_{max}$ |
| PX3' | 0.5 + V' | $[(1 − V')/2]*|_{max}$ |

Comparing Tables 1 and 3, the pixel display intensities for the two pixels, PX2 and PX1, of the two-pixel method correspond to those of pixels PX2' and PX3', respectively, of the three-pixel method. Thus, the pixel display intensity of the pixel closer to the displayed line in the two-pixel method, i.e., PX1, corresponds to the display intensity of the pixel furthest away from the line in the three-pixel method, i.e., PX3'. Also, the pixel display intensity of the other pixel of the two-pixel method, i.e., PX2, corresponds to that of the second closest pixel to the display line in the three-pixel method, i.e., PX2'. The intensity of the pixel closest to the line in the three-pixel method is $[(1.5−|V'−0.5|)2]*I_{max}$. Therefore, for the conventional three-pixel method, display intensity still needs to be calculated for each of the three pixels.

Figure 4:
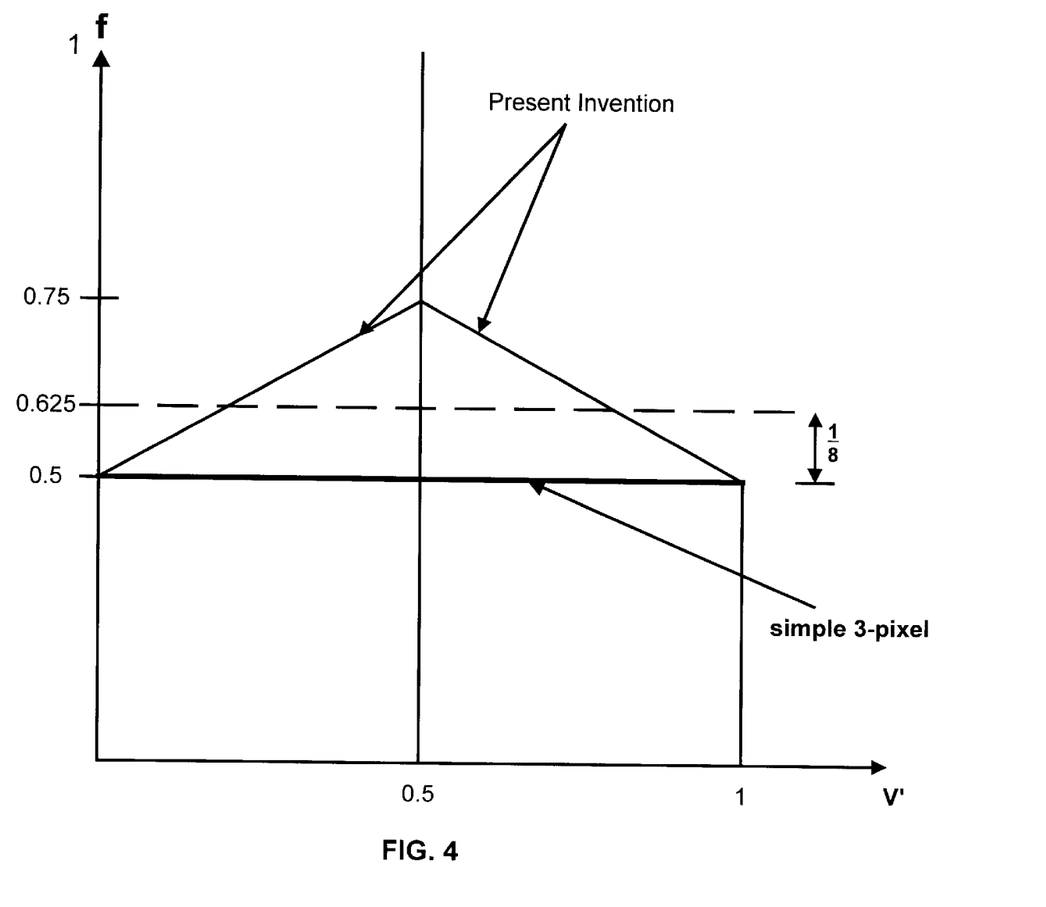
FIG. 4 is a plot showing the relationship between pixel intensity and distance for the pixel closest to a displayed line in the three-pixel method.

However, by defining a variable f such that it may be represented as f=(1.5−V'−0.5|)/2, the intensity may be represented as $f*I_{max}$, and the relationship between f and V' may be illustrated as shown in FIG. 4. Since V' has a value between 0 and 1, f may be calculated accordingly. Referring to FIG. 4, f has a value of 0.5 when V' is equal to 0 and 1 and has a maximum value of 0.75 when V' is equal to 0.5. The average value for f is 0.625. Therefore, the average pixel display intensity for the pixel closest to the displayed line is 0.625 times the maximum pixel intensity, and the maximum displayed intensity is 0.75 times the maximum pixel intensity.

Therefore, in accordance with the present invention, the intensity of the pixel closest to the displayed line is defined as a constant, 0.625, multiplied by the maximum pixel intensity. The modified three-pixel antialiasing method of the present invention generates outputs in an expedited manner because the number of calculations required is decreased as compared to the conical antialiasing method and the conventional three-pixel antialiasing method.

Although the conical antialiasing method produces a superior output in comparison with conventional two-pixel or three-pixel antialiasing methods, a comparison between the modified three-pixel antialiasing method of the present invention and the conical antialiasing method shows that difference is minimal for transfer function outputs prior to multiplication by the maximum pixel intensity of a pixel at various distances from the displayed line. The comparison is shown in Table 4.

TABLE 4

| Distance from Pixel | Conical Method | 3-Pixel Method of the Present Invention | Difference |
|---|---|---|---|
| 0 | 0.78 | 0.75 | −0.03 |
| 0.07 | 0.78 | 0.72 | −0.06 |
| 0.13 | 0.76 | 0.68 | −0.08 |
| 0.2 | 0.71 | 0.65 | −0.08 |
| 0.26 | 0.7 | 0.62 | −0.08 |
| 0.33 | 0.66 | 0.59 | −0.08 |
| 0.39 | 0.61 | 0.55 | −0.06 |
| 0.46 | 0.56 | 0.52 | −0.04 |
| 0.52 | 0.5 | 0.49 | −0.01 |
| 0.59 | 0 44 | 0.46 | 0.02 |
| 0.65 | 0.38 | 0.42 | 0.04 |
| 0.72 | 0.33 | 0.39 | 0.06 |
| 0.78 | 0.28 | 0.36 | 0.08 |
| 0.85 | 0.23 | 0.33 | 0.1 |
| 0.91 | 0.18 | 0.29 | 0.11 |
| 0.98 | 0.15 | 0.26 | 0.12 |
| 1.04 | 0.11 | 0.23 | 0.12 |
| 1.11 | 0.08 | 0.2 | 0.12 |
| 1.17 | 0.06 | 0.16 | 0.11 |
| 1.24 | 0.04 | 0.13 | 0.09 |
| 1.3 | 0.02 | 0.1 | 0.08 |
| 1.37 | 0.01 | 0.07 | 0.03 |
| 1.43 | 0 | 0.03 | 0.03 |
| 1.5 | 0 | 0 | 0 |

Figure 5:
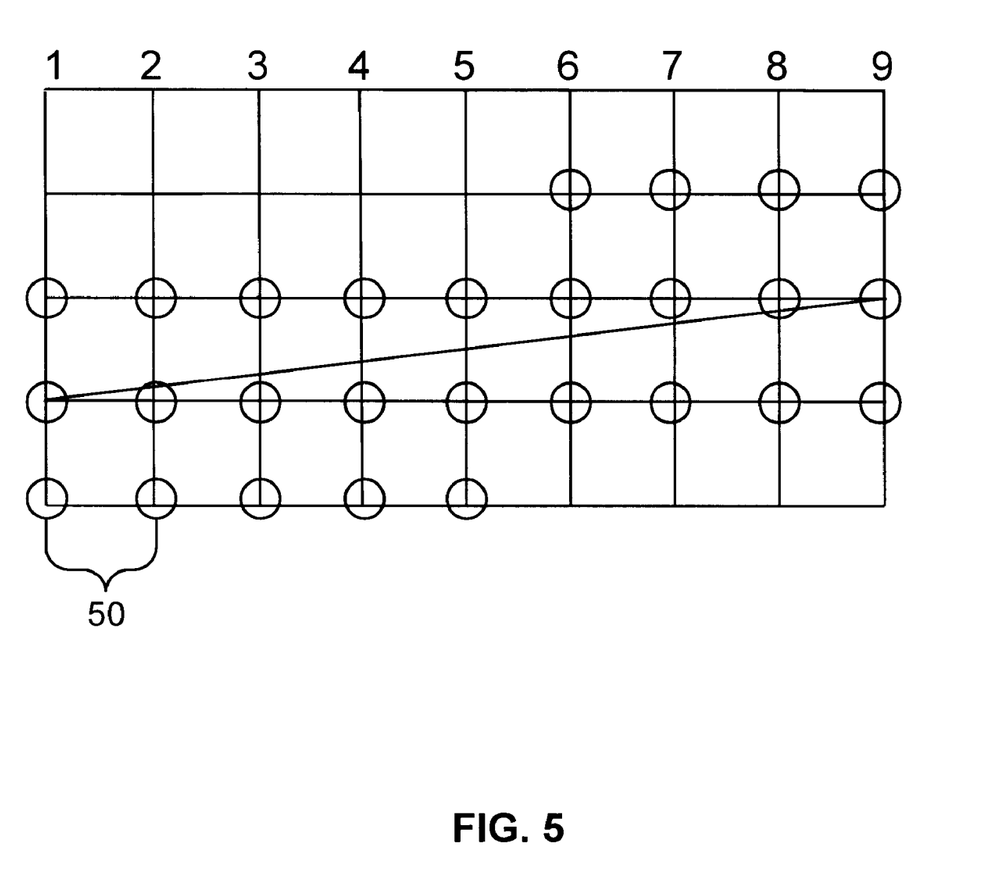
FIG. 5 shows a displayed line in a display matrix with a plurality of pixels.

In addition, in accordance with the method of the present invention, the total luminescence of the pixels changes according to distance from the displayed line, as is evident from Table 4. Specifically, as the total luminescence is distributed more evenly among the three pixels, the total luminescence increases accordingly. If the intensity is concentrated with one or two pixels, the total luminescence decreases. In contrast, the total pixel intensity of the conical method remains relatively unchanged. As an example, FIG. 5 shows a displayed line in a display matrix having a plurality of pixels 50. The line is displayed first with the conventional conical method and then with the antialiasing method of the present invention. Intensities for the three closest pixels along the column, or the y-axis, are recorded and shown in the following Tables 5 and 6 in RGB values.

TABLE 5

Conical Method

| Col. | 1 | 2 | 3 | 4 | 5 | 6 | 7 | 8 |
|---|---|---|---|---|---|---|---|---|
| PX2 | 9 | 14 | 20 | 27 | 0 | 0 | 2 | 5 |
| PX1 | 49 | 48 | 46 | 41 | 35 | 41 | 46 | 48 |
| PX3 | 9 | 5 | 2 | 0 | 35 | 27 | 20 | 14 |
| Total | 67 | 67 | 68 | 68 | 70 | 68 | 68 | 67 |

TABLE 6

Present Invention

| Col. | 1 | 2 | 3 | 4 | 5 | 6 | 7 | 8 |
|---|---|---|---|---|---|---|---|---|

TABLE 6-continued

| | Present Invention | | | | | | | |
|---|---|---|---|---|---|---|---|---|
| PX2' | 15 | 19 | 23 | 27 | 0 | 3 | 7 | 11 |
| PX1' | 47 | 43 | 39 | 35 | 31 | 35 | 39 | 43 |
| PX3' | 15 | 11 | 7 | 3 | 31 | 27 | 23 | 19 |
| Total | 77 | 73 | 69 | 65 | 62 | 65 | 69 | 73 |

Therefore, the modified three-pixel antialiasing method of the present invention not only requires fewer calculations than conventional antialiasing methods, but also provides display images of a quality comparable to those of the conventional conical antialiasing method. Because the number of calculations is decreased, the method of the present invention is also able to provide displays or outputs in an expedited manner. Additionally, the present invention does not utilize valuable memory space in ROM to store a look-up table as with the conical method.

Figure 6:
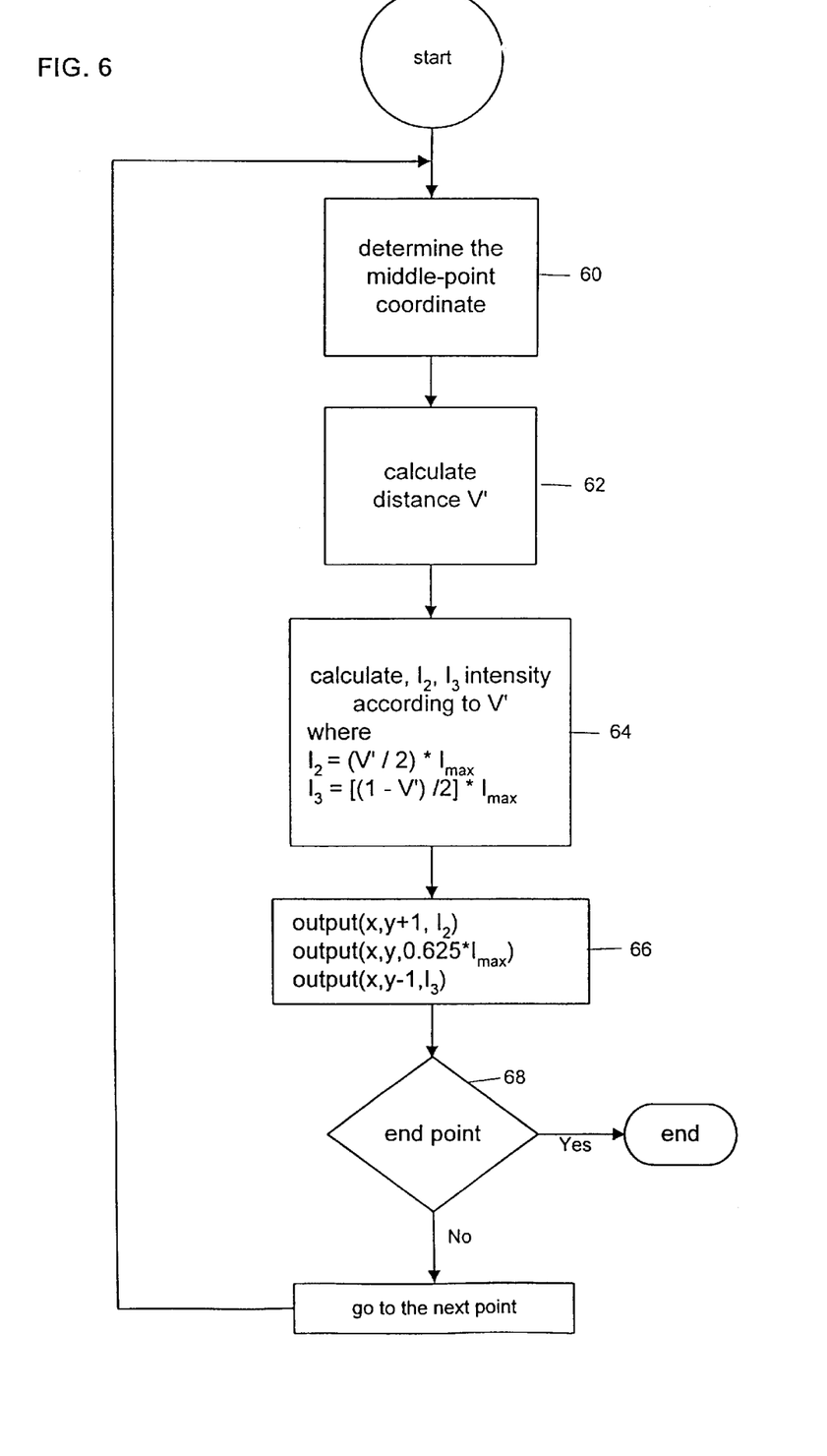
FIG. 6 is a flowchart representing the steps of the process of the present invention.

FIG. 6 shows the method of the present invention including the step of determining the middle-point coordinate within the matrix. Since the modified three-pixel method considers three pixels at a time along an axis, the coordinates of the three pixels have the same value either along the x-axis or the y-axis. In this illustrative example, the pixels are aligned along the x-axis. Referring to FIG. 3, the middle-point is the pixel having the shortest distance along the y-axis to a predetermined point on an image to be displayed. Referring again to FIG. 6, the method of the present invention begins by a step 60 of determining the middle-point coordinate within the matrix. After the middle-point is identified, a step 62 of calculating the distance, V', between the pixel and the displayed image is performed.

Step 62 of calculating the distance V' is followed by a step 64 for determining pixel intensities. Since the display intensity of the middle-point remains a constant, the display intensity for each of the two remaining pixels having the second and third shortest distance from the point of the image is calculated. The intensity is obtained according to the calculations described in Table 2 or Table 3. Therefore, pixel intensities for the second $I_2$ and third $I_3$ pixels are $(V'/2)*I_{max}$ and $[(1-V')/2]*I_{max}$, respectively, where $I_{max}$ represents the maximum pixel intensity. Therefore, as shown in step 66 of FIG. 6, the three pixels have the matrix coordinates of (x, y+1), (x, y), and (x, y−1) and intensities of $I_2$, $0.625*I_{max}$, and $I_3$.

A step 68 of the present invention then determines whether the point displayed is the final point to be displayed for the image. If it is, the method terminates. If it is not, steps 60, 62, 64, 66, and 68 are repeated for the next point.

It will be apparent to those skilled in the art that various modifications and variations can be made in the disclosed process and product without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for calculating intensities of selected pixels in a matrix of pixels for displaying a line, comprising the steps of:

locating a first pixel having a shortest distance along an axis of the matrix array from the line, determining said shortest distance, calculating a first pixel intensity of said first pixel by multiplying a maximum intensity of said first pixel by a predetermined constant value, locating a second pixel having a second shortest distance along said axis from the line, locating a third pixel having a third shortest distance along said axis from the line, calculating a second pixel intensity for said second pixel; and calculating a third pixel intensity for said third pixel.

2. The method as recited in claim 1 wherein said constant value is approximately between 0.5 and 0.75.

3. The method as recited in claim 1 wherein said constant is 0.625.

4. The method as recited in claim 1 wherein said second pixel is above said first pixel and said second pixel intensity is equal to V'/2 multiplied by a maximum intensity of said second pixel, wherein V' is a normalized distance between said first pixel and the line along an axis of the matrix.

5. The method as recited in claim 1 wherein said third pixel is below said first pixel and said third pixel intensity is equal to (1−V')/2 multiplied by a maximum intensity of said third pixel, wherein V' is a normalized distance between said first pixel and the line along an axis of the matrix.

6. The method as recited in claim 1 wherein said second pixel is below said first pixel and said second pixel intensity is equal to (1−V')/2 multiplied by a maximum intensity of said second pixel, wherein V' is a normalized distance between said first pixel and the line along an axis of the matrix.

7. The method as recited in claim 1 wherein said third pixel is above said first pixel and said third pixel intensity is equal to V'/2 multiplied by a maximum intensity of said third pixel, wherein V' is a normalized distance between said first pixel and the line along an axis of the matrix.

8. An antialiasing method for displaying an image on a device including a matrix array of pixels, comprising the steps of:

identifying a point on the image to be displayed, locating a first pixel having a shortest distance V along an axis of the matrix array from the point, determining said shortest distance V, calculating a first pixel intensity of said first pixel by multiplying a maximum intensity of said first pixel by a predetermined constant value, calculating a second pixel intensity of a second pixel having a second maximum pixel intensity by multiplying said second maximum pixel intensity by V'/2, wherein V' is a normalized distance between said first pixel and the line and is equal to V plus 0.5; and calculating a third pixel intensity of a third pixel having a third maximum pixel intensity by multiplying said third maximum pixel intensity by (1−V')/2.

9. The method as recited in claim 8 wherein said maximum intensity of said first pixel, said second maximum pixel intensity, and said third maximum pixel intensity are equal.

10. The method as recited in claim 8 wherein said constant value is approximately between 0.5 and 0.75.

11. The method as recited in claim 8 wherein said constant is 0.625.

12. A method for calculating intensities of selected pixels in a matrix of pixels for displaying a line, comprising the steps of:

locating a first pixel having a shortest distance along an axis of the matrix array from the line, determining said shortest distance, calculating a first pixel intensity of said first pixel by multiplying a maximum intensity of said first pixel by a predetermined constant value, calculating a second pixel intensity for a second pixel above said first pixel; and calculating a third pixel intensity for a third pixel below said first pixel.

13. The method as recited in claim 12 wherein said constant value is approximately between 0.5 and 0.75.

14. The method as recited in claim 12 wherein said constant is 0.625.

15. The method as recited in claim 12 wherein said second pixel intensity is equal to V'/2 multiplied by a maximum intensity of said second pixel, wherein V' is a normalized distance between said first pixel and the line along an axis of the matrix.

16. The method as recited in claim 12 wherein said third pixel intensity is equal to (1−V')/2 multiplied by a maximum intensity of said third pixel, wherein V' is a normalized distance between said first pixel and the line along an axis of the matrix.

* * * * *